United States Patent [19]

Yang et al.

[11] Patent Number: 5,253,100
[45] Date of Patent: Oct. 12, 1993

[54] SOLID ELECTROLYTES FOR CONDUCTING POLYMER-BASED COLOR SWITCHABLE WINDOWS AND ELECTRONIC DISPLAY SERVICES

[75] Inventors: Sze Cheng Yang, Kingston, R.I.; Jyun-Hwei Hwang, Taipei, Taiwan

[73] Assignee: The Board of Governors for Higher Education, State of Rhode Island and Providence Plantations, Providence, R.I.

[21] Appl. No.: 373,195

[22] Filed: Jun. 27, 1989

Related U.S. Application Data

[63] Continuation-in-part of Ser. No. 203,270, Jun. 7, 1988, Pat. No. 4,842,383, which is a continuation-in-part of Ser. No. 858,384, May 1, 1986, Pat. No. 4,749,260.

[51] Int. Cl.$^5$ ............................................. G02F 1/01
[52] U.S. Cl. ..................................... 359/266; 359/269; 359/270; 359/273
[58] Field of Search ............... 350/357, 355; 359/266, 359/269, 270, 273; 204/294

[56] References Cited

U.S. PATENT DOCUMENTS

| | | | |
|---|---|---|---|
| 4,571,029 | 2/1986 | Skotheim et al. | 350/357 |
| 4,586,792 | 5/1986 | Yang et al. | 350/357 |
| 4,842,383 | 6/1989 | Yang et al. | 350/357 |

OTHER PUBLICATIONS

*Journal of Physical Chemistry* McManus et al., "Influence of Oxidation and Protonation on the Electrical Conductivity of Polyaniline", 1987, pp. 744–747.
*Synthetic Metals* J. H. Hwang and S. C. Yang "Morphological Modification of Polyaniline using Polyelectrolyte Template Molecules", 1989, pp. 271–276.
Proceedings of the SID, vol. 28/3, "A Solid Electrochromic Cell Consisting of Lu-Diphthalocyanine and Lead Fluoride" Egashira et al., 1987 pp. 227–237.
"Modified Viologens with Improved Electrochemical Properties for Display Applications", *J. Electrochem. Soc.: Electrochemical Science and Technology* Bruinink et al., Dec. 1977, pp. 1854–1858.
"Electrochemical Doping of Polyaniline: Effects on Conductivity and Optical Spectra", McManus et al., *Journal of the Chemical Society*, 1985 pp. 1554–1557.
"Protonation and Electrochemical doping of polyaniline: Correlation between the changes in electrical conductivity and optical spectrum" *Makromol. Chem., Rapid Commun.* 8, Cushman et al. 1987 pp. 69–75.
"Spectroelectrochemical Study of Polyaniline: The Construction of a pH–Potential phase Diagram", *J. Electroanal. Chem.* 291 (1986) pp. 335–346.

*Primary Examiner*—William Mintel
*Assistant Examiner*—Roy Potter
*Attorney, Agent, or Firm*—Samuels, Gauthier & Stevens

[57] ABSTRACT

Electrochromic material, i.e. polyaniline, is polymerized in situ in a polymeric electrolyte to form an electrochromic/polyelectrolyte mixture. The mixture is coated as a film on electrochromic material. A film of electrolyte is placed in ion transfer relationship with the electrochromic/polyelectrolyte film. This electrochromic/polyaniline/polyelectrolyte film greatly increases the ion transfer between the electrochromic film and the electrolytic film by imposing a region of molecularly mixed electrochromic material and electrolyte.

47 Claims, 4 Drawing Sheets

SOLID ELECTROLYTES FOR CONDUCTING POLYMER-BASED COLOR SWITCHABLE WINDOWS AND ELECTRONIC DISPLAY SERVICES

CROSS-REFERENCE TO RELATED APPLICATIONSS

This application is a continuation-in-part application of U.S. Ser. No. 07/203,270 filed Jun. 7, 1988—now U.S. Pat. No. 4,842,383 which was a continuation-in-part application of Ser. No. 06/858,384 filed 1 May, 1986, now U.S. Pat. No. 4,749,260.

BACKGROUND AND BRIEF SUMMARY OF THE INVENTION

Electrochromism describes the induction of a color change in a medium as a result of charge transfer or electron transfer caused by an externally applied potential. The color changes are indications of induced chemical changes in the species of interest. For most chemical species exhibiting this effect, the change is from one color to another. As an example, viologen dye molecules change from yellow-orange to blue when reduced at a cathode. J. Bruinik, C. G. A. Kregting, and J. J. Ponjee, *J. Electrochem. Soc.* 124, 1854 (1977). Solid films of $WO_3$ also show electrochromism with transparent films becoming blue upon reduction.

In order for electrochromic materials to be useful for display purposes, they must have optical absorption in the visible spectrum and exhibit mixed conduction capability (i.e. electronic and ionic). It is also highly desirable to exhibit high contrast from the background in order to modulate ambient light. Electrochromic materials generally have these properties. Electrochromic materials are usually operated with low voltages and can provide suitable contrasts with charge transfer of only several millicoulombs of electrical charge per square centimeter of display area. Erasure is easily made by polarity changes. These materials may also have the ability to hold images for the required response time of the human eye (about 0.1 second) and this further may allow for the use of memory effects. A major disadvantage of electrochromic displays is the lifetime of the device. Chemical degradation frequently occurs as usage time increases.

This disclosed invention is an improvement of the inventions described and claimed in U.S. Pat. No. 4,586,792 and co-pending application Ser. No. 858,384 filed 1 May 1986 both of which are incorporated by reference in their entireties in this disclosure. Further, a discussion of both the prior art generally and polyaniline is set forth in those documents. Also, the following publications by the inventor discuss the structure and electrochromism of polyaniline. McManus, P. M., Yang, S. C. and Cushman, R. J., Electrochemical Doping of Polyaniline: Effects on Conductivity and Optical Spectra, J. Chem. Soc, Chem. Commun., 1985, pp. 1556-1557; Cushman, R. J., McManus, P. M., Yang, S. C., Protonation and electrochemical doping of polyaniline: Correlation between the changes in electrical conductivity and optical spectrum, Makromol Chem., Rapid Commun. 8, pp. 69-75 (1987); Cushman, R. J., McManus, P. M. Yang, S. C., Spectroelectrochemical Study of Polyaniline: The Construction of a pH-Potential Phase Diagram, J. Electroanal. Chem. 291, pp. 335-346 (1986); and Cushman, R. J., McManus, P. M., Yang, S. C., Influence of Oxidation and Protonation of the Electrical Conductivity of Polyaniline, The Journal of Pysical Chemistry, Vol. 91, No. 3, pp. 744-747 (1987). Morphological Modification of Polyaniline Using Polyelectrolyte Template Molecules, Hwang, J. H., Yang, S. C., Synthetic Metals, Vol. 29, P. P. E271--E276, (1989).

The display elements of the prior invention overcame to some extent the prior art problems of longevity and the inability of the films to repeatedly produce color changes, including transparent, which are necessary for the successful application of electrochromism in electronic color display devices. Further advantages of those inventions were a display screen in a thin plate or rollable sheet which consumed a minimal amount of electrical power. Most importantly, a multicolor display was achieved which capability was not available in then available liquid crystal display devices.

One of the prior inventions was directed to the use of the polymeric aniline between two transparent surfaces for use such as in windows, windshields, glasses, bowls, decorative panels and the like. The invention embodied multi-color switchable panels which responded rapidly and changed colors and tints with rapidity and also became completely transparent. The prior inventions disclosed the use of both solid and liquid electolytes although the liquid electrolytes were disclosed for the preferred embodiment.

The present invention embodies (1) the use of solid electrolytes such as described in the original patent and as prepared in the prior referenced application, (2) the use of polymer composites of polyaniline/polyelectrolyte as electrochromic material, (3) the construction of a layered structure of the polyaniline/polyelectrolyte composite so that the type and the concentration of the polyelectrolyte in the composite are varied.

The function of the electrolyte in an electrochromic device is to serve as an ion-conductor to complete an electrical circuit. By allowing ions to migrate between the two outer electrodes, the electrolyte carries the electrical current that is necessary for the color switching. The electrolyte allows the ions to transport between the two plates but blocks the flow of the "free" electrons.

Solid electrolyte is more practical than liquid electrolyte for manufacturing electrochromic devices. In an electrochromic light filter or an electronic display, the electrolyte is sandwiched between two flat electrodes. When a liquid electrolyte is used, the two flat electrodes need to be sealed before the liquid electrolyte is introduced. The use of a thin film solid electrolyte renders the manufacturing process much easier because no such sealing is involved in making the sandwich structure.

The solid electrolyte films generally function as having two layers, an ion storage layer and an ion conductor layer. The ion conductor layer interfaces with the electrochromic layer. The color changes are effected by ions moving between the conductive layer and the electrochromic layer. The ions entering and leaving the electrochromic layer result in the color changes. Because the electrochromic and ion conductor layers have rigid lattice structures and must repeatedly expand and contract to accept and release the ions, ultimately mechanical strains develop and cracks and gaps are formed at the interface between the conductive layer and the electrochromic layer resulting in degradation of the color.

The mechanical contacts between the electrochromic material and the solid electrolyte are not achieved down to the molecular level. Two solids usually do not adhere well. For example, if a film of $PbF_2$ solid electrolyte is pressed upon a Lu-diphthalocyanine film coated on tin oxide glass by mechanically contacting the two films, the electrical resistance is prohibitively large for it to complete a circuit. At the microscopic level, only a small fraction of atoms are making molecular level contacts.

There have been attempts to make closer contact between the two films by molecular deposition. The electrolyte molecules are vapor deposited onto the electrochromic film in a slow process where the thickness of the electrolyte is built up from monomolecular layers. For example the solid electrolyte $PbF_2$ is evaporated onto a Lu-diphthalocyanine electrochromic electrode. In this manner the solid electrolyte grows by molecular layers instead of by chunks. The molecules of the solid electrolyte $PbF_2$ fill into the microscopic cracks and the holes of the electrochromic phase (Egashira et al. Proceedings of the Society for Information Display, 28 227 (1987)). The films built up in this way have fewer gaps in the interface than when two layers are pressed together.

The problems with the vapor deposition process are two fold. It is a more costly process than laying down the prefabricated polymer electrolyte films; and the good static contact is soon lost after a number of switching cycles. This is because during the color switching cycles, the dimension of the lattice changes in each cycle. The flouride ion is inserted and removed from the interface during each cycle. The dimensional changes are not reversible enough to maintain the original mechanical contacts at the interface.

In the prior art, polymer electrolytes are believed to have been used for only one of the two phases at the interface. For example, the solid electrolyte was a polymer electrolyte but the electrochromic material was an inorganic solid which has a rigid lattice (T. Katsube, M. Hara, T. Yaji, S. Kobayashi, K. Suzuki, and Y. Nagawa, Proceedings of the Society of Information and Display, Vol. 28/3 (1987), pp. 233-237). The problem of lattice expansion/contraction cycles still remains in the electrochromic layer. The severity of the problem is partially lessened by using smaller ions ($H^+$ and $Li^+$) as the dopant which shuttles across the interface. But the problem is not totally solved. In addition the inorganic solid electrochromic materials do not share some of the advantages of the organic polymer electrochromic materials.

The disclosed invention overcomes the prior art problems of both rigidity and a planar interface between the electrochromic film and the electrolyte film. The electrochromic material of the invention is polymerized 'in situ' in a polymeric electrolyte to form an electrochromic/polyelectrolyte mixture. This mixture is coated as a film on electrochromic material. A film of electrolyte is placed in ion transfer relationship with the electrochromic/polyelectrolyte film. This electrochromic/polyanaline/polyelectrolyte film greatly increases ion transfer between the electrochromic film and the electrolytic film by interposing a region of molecularly mixed electrochromic material and electrolyte.

In the preferred embodiment of this invention, the film of electrolyte is itself a polymer so it can be formed as a thin plastic film. State of the art processes for making laminated glass or plastics can be adapted easily. The polymer electrolyte can also be dissolved in solvents and painted or sprayed onto the electrodes and be fixed by evaporating the solvent as disclosed in the previously cited application.

This invention involves an improvement over the prior art for electrochromic light filters. The improvement is realized by using compatible or common polymers for both the electrochromic and the electrolyte films to form polymer-based junctions at the molecular level between the electrochromic and electrolyte films. The improvements result in lower manufacturing costs and the devices have better switching characteristics and a longer life span.

The term "solid electrolyte" for purposes of this disclosure includes, in addition to normally solid materials, viscous materials, as long as the fluidity of the electrolyte alone or in combination with the electrochromic material is low enough to remain dimensionally stable during manufacture and use of the electrochromic device. It is conceivable that a viscocity comparable to glycerol (greater than 10 poise) is sufficient for gaining the desired advantages in manufacturing.

Solid polymer electrolytes are used that do not have rigid lattices. The conformation or the structure of the host molecules (electrolyte) is flexible enough so that it reversibly expands and contracts, in synchronization with the ion movements. The flexibility of the polymer molecules allows the dynamic strain be relieved.

Preferred solid electrolyte includes but are not limited to;

Poly-(vinylsulfonic acid) or its salts, $[-CH_2CH(SO_3H)-]_n$;
Poly-(acrylic acid), $[-CH_2CH(CO_2H)-]_n$;
Poly-(styrene sulfonic acid) $[-CH_2CH(C_6H_4SO_3H)-]_n$
Poly-(2-acrylamido-2-methyl-1-propane-sulfonic acid), $(-CH_2CH[CONHC(CH_3)_2-CH_2SO_3H-]_n$;
Poly-(ethylene oxide), $(-CH_2CH_2O-)_n$;
Polyphosphazenes, A family of polymers with polyphosphzene backbones and polyether side groups. For example:

Polyelectrolytes and gel electrolytes are polymers that have either cationic or anionic groups chemically bonded to a polymer chain. Among the group of chemicals cited in the above polyacrylic acid, polystyrene sulfonic acid and some others are examples of polyelectrolytes. When these polymers are cross linked they can form gel electrolytes. In the electrochromic devices, the polyelectrolytes are mixed with a small amount of high dielectric constant solvent (such as water or propylene carbonate) so that the counter ions of the polyelectrolyte can migrate within the matrix formed by the polymer chains. If gel electrolyte is used, small amounts of polar solvent and salt are added to increase the ion conductivity. Usually about 1% by weight of the solvent or salt is sufficient to maintain ionic conductivity for thin films of solid electrolyte layer.

The invention, in one aspect, is a composition of the polymeric aniline molecularly mixed with solid polymer electrolytes. In another aspect, the invention embodies the mixture in combination with an electrochromic device.

The inventive improvements involve better mechanical stability of the electrochromic device and better cycling lifetimes.

To achieve these improvements, the electrochromic material, polyaniline, is synthesized in a solution of polyelectrolyte so that the morphology of polyaniline is controlled to provide good contact with the solid electrolyte layer of the electrochromic device. Furthermore, the condition for synthesis is adjusted so that suitable composite is formed from polyaniline and some electrolytes. The composite polymer provides further advantages for good mechanical strength and better ion exchange properties.

DESCRIPTION OF THE PREFERRED EMBODIMENT

Figure 1:
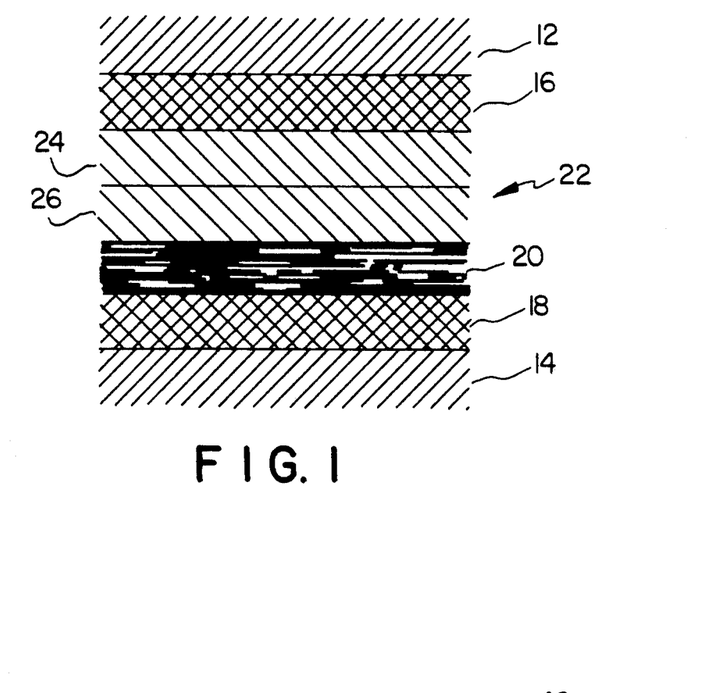
FIG. 1 is a side view of a prior art electrochromic device.

An electrochromic device commonly consist of a multi-layered structure as shown in FIG. 1. Typically, the structure comprises supporting structures 12 and 14 such as glass, metal etc. and electrodes 16 and 18. Electrochromic material 20 is coated on one electrode, here the electrode 18, and an electrolyte 22 is coated on or engages the other electrode 16 and also contacts the electrochromic material 20. The electrolyte 22 functions in two layers, an ion storage layer 24 and an ion transport layer 26.

A specific example of such a structure is disclosed in a recent publication (N. Egashira et al, supra). In such a device the conductor for the electrode 18 is a layer of indium tin oxide transparent conductor coated on the supporting glass plate 14. The ion storage layer 24 and the ion conductor layers 26 are combined in a lead fluoride, $PbF_2$, solid electrolyte. The electrochromic material 20 is Lu-Diphthalocyanine. The conductor 16 is a reflective gold coating.

The $PbF_2$ layer serves several functions: it is an electronic insulator that avoids electrical short circuit between the counter electrode and the working electrode; it is an ion conductor due to the mobility of the fluoride ions, $F^-$; and it also serves as a source of flouride ion $F^-$.

During the cycles of color-switching, the $F^-$ ions move back and forth between the ion conductor layer 26 and the electrochromic layer 20. By the electrochromic process, the ion insertion and depletion in the electrochromic layer is the necessary part of the chemistry involving the color switching.

The repeated ion insertion/depletion cycles cause eventual failure of the device. Because the fluoride ion has a finite size of about 0.14 nm, when the fluoride ion moves from the electrochromic to the electrochroic layer, the lattice of the solid electrolyte, $PbF_2$, contracts and the lattice of the electrochromic material expands. The process is reversed in the other half cycle of the switching. Because the solids have a rather rigid lattice structure, the forced movement of the ions causes mechanical strain to develop. This mechanical strain causes microscopic cracks and gaps to form at the interface and the electrical communication between these layers is lost. The quality of the color-switching will degrade as the device is cycled. For example, the contrast will become poorer because some fraction of the electrochromic material will not switch color because it is not in communication with the ion conductor. As a signifcant fraction of the contact is lost the electrochromic element stops to be useful.

The damaging strain on the lattice of the host material, the electrolyte, is originated in the dimensional changes associated with the ion insertion/depletion process. If the host lattice is too rigid the repeated cycles of strain results into microscopic gaps between the layers and this results in short switching lifetimes.

The dynamic nature of the interface in electrochromic devices requires a set of criteria for a "good" connection very different from that of other interfaces. To give examples of the familiar other types of interfaces: The interface between paint and a metallic surface needs to be strongly adhesive. The interface between the semiconductor p-n junction should have good molecular (or atomic) level contact so that electrons can commute back and forth. An interface in the electrochromic material needs to have both of these "good" properties and more: It must have the dimensional flexibility to accommodate the insertion and the depletion of ions; its lattice has to "breathe" as the color is cycled.

In this invention, the contact area between electrochromic and electrolyte phases is enhanced. The modification of the morphology of the electrochromic polymer at the interface promotes better mechanical contact and electrical communication.

The contact surface between the films is more than a two-dimensional plane. The contact surface is increased to a three dimensional region by forming interlocking structures between the fibers of the electrochromic and the electrolyte polymers. The region is embodied in a film.

The electrochromic material preferred is polyaniline. The origin of the unique electrochromic effect for polyaniline is most likely due to structural changes occurring in the polymer backbone upon electrochemical cycling. In the most oxidized form, these should be extensive—conjugation along the backbone producing the intense blue color. In the most reduced form, there should be little conjugation and thus the transparent color results. Schematically the two extremes can be depicted as:

Oxidized form

Reduced form

The intermediate colors from blue-green to yellow are due to various compositions of oxidized and reduced moieties including delocalized polymer radicals and polymer cations. A polymer backbone structure containing aromatic rings linked by nitrogen atoms is favorable to the electrochromic properties because of the stability of these colored polymer radicals and anions. Polymers built from monomers with structures I, II and III (see below) all have such favorable backbone structures and they are suitable as a electrochromic display material. The nature of anions present and pH of the electrolyte also influence the color distribution since the acid-base characteristics of the polymer are important to film properties. It is also plausible that the polymer contains more than one kind of monomer unit or crosslink between chains. Both of these structural possibilities could contribute to the tunability of the film color.

The addition of substituent groups to the aromatic rings can alter the properties of the films. Electron withdrawing substituents such as nitro groups would lower the oxidation potentials, whereas electron donating groups will tend to raise these potentials. Thus, the window of accessible potentials is tuned as will the color of the films, due to changes in electronic structure. Appropriate choice of a combination of substituent groups will provide flexibility in modifying the electrochromic properties of the polymer films. These polymers can be prepared from the monomers of the structures I, II, and III where $R_1$ to $R_8$ Structure I Structure II Structure III $R_1$ to $R_8$ = any one of the following: —H, —$(CH_2)_nCH_3$ n = 0 to 10) —$OCH_3$, —$OC_2H_5$, —$NH_2$ —Cl, —F, —Br, —I, —CN, —$SO_3H$, (where m, n, l = 0 to 5 and X = any of the above groups)

When the polymer is in the clear, the blue and the purple colored stages, the polymer molecules are electrically neutral but the polymer molecule carries a positive charge (i.e. a cation) when it is in the green stage. This indicates that during the switching of colors there are associated movements of ions across the interface between the electrolyte and the electrochromic polymer. For example, when the polymer is switched from clear to green, the polymer turns from a neutral amine into a positively charged radical cation because some of the electrons flow from polyaniline to the potential contacting electrode, i.e. an electro-oxidation. When the switches increases, the polymer fiber becomes positively charged because its component molecules change from neutral to positively charges cation molecules. In order to establish electrical neutrality, the anions such as $Cl^-$, the chlorides, stored in the electrolyte film are drawn into the polyaniline fiber.

As the electrochemical potential is further increased, the color of polyaniline changes from green to blue. The associated chemical transformation involves the breaking of N-H bonds to release protons. The loss of protons from the green polymer radical cation is associated with a rearrangement of electronic structure of the molecule into an electrically neutral quinone-diimine structure. For each electron removed from the polymer there are two protons (and the associated two positive charges) lost from the polymer; the net effect is to change the polymer cation into a neutral molecule. Since the polyaniline molecule is now electrically neutral, it does not have the coulomb force to attract the anion to its vicinity. The anions, if they were the chlorides, are now free to diffuse away from the polymer and some of them will diffuse across the polyaniline/electrolyte interface.

Experimental evidences of the structural changes associated with the color switching described here have been discussed in previous publications. Examples are: McManus, P. M., Yang, S. C., and Cushman, R. J., J. Chem. Soc. Chem. Commun., 1985, pp. 1556-1557; Cushman, R. J., McManus, P. M., Yang, S. C. Makromol Chem., Rapid Commun., Vol. 8, pp. 69-75; Cushman, R. J., McManus, P. M., Yang, S. C., J. Electroanl. Chem., Vol. 291, pp. 335-346.

In the prior art exemplified by the references cited in the previous sections (Egashira et al., Proceedings of the Society for Information Display, 28 227 (1987), Katsube et al., Proceedings of the Society of Information and Display, Vol. 28/3 (1987), pp. 233-237), the interface between the electrochromic material and the ion conductor is a two-dimensional plane of contact because at least one side of the interface is rigid and not porous enough to have the two phases interpenetrable. Such interface has the disadvantage of relatively low contacting surface area and the rigidity of the interface also leads to fracturing of the interface structure after repeated cycles. The present disclosure described a method that significantly modifies the morphology and the composition of the electrochromic layer so that the property of the interface between polyaniline and the solid electrode is further improved.

Figure 2:
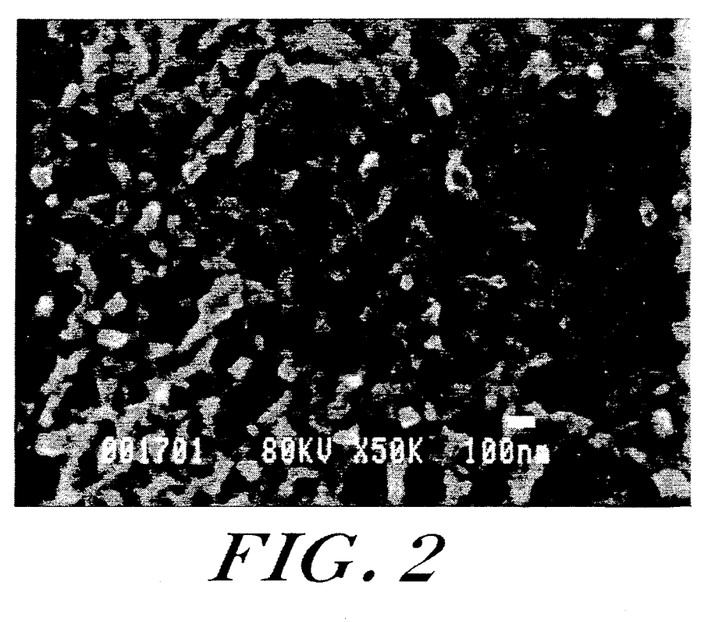
FIG. 2–6 are scanning electron micrographs illustrating the morphology of the polyaniline and the mixing between the polyaniline and the solid electrolyte.

The morphology of polyaniline is shown in the scanning electron micrograph of FIG. 2. Fibers with diameter of about 80 nm form networks with voids forming channels with diameters as large as 150 to 200 nm. Since the fibers are formed into networks the channels are well connected to the surface of the electrochromic layer. This structure is far more porous than those of the prior art mentioned before. When polymers are used to form the solid electrolyte layer, the solid electrolyte can penetrate into the channels in the electrochromic layer so the solid electrolyte and the polyaniline network are interlocked into an integral unit. This gives a mechanically strong bonding between the two layers, and a high surface area contact to provide good electrical communication.

The interface is further improved in this invention by modifying the polymer morphology of polyaniline and to form a polyaniline/polyelectrolyte composite in the electrochromic layer.

Figure 3:
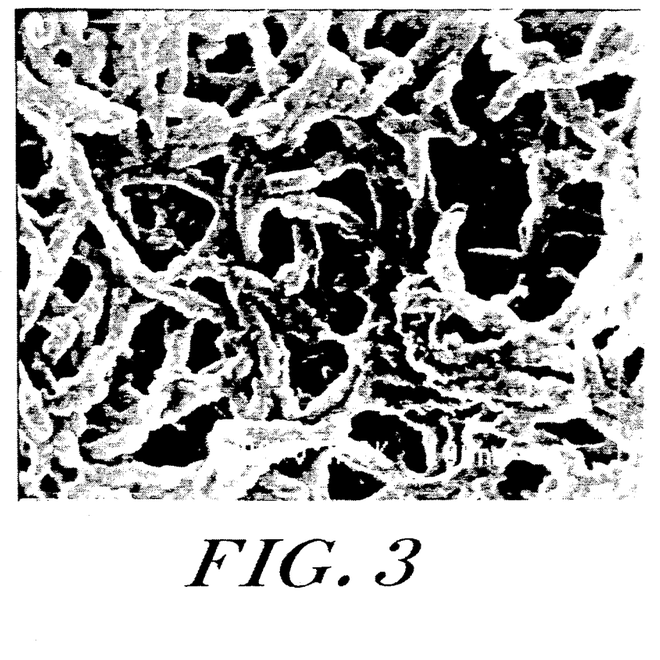
Figure 5:
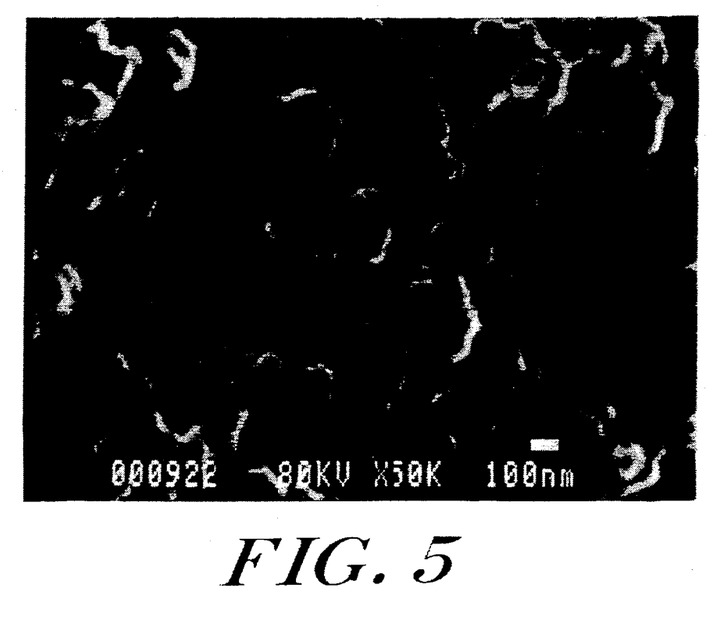

In general the morphological modification of polyaniline is achieved by using polymer electrolytes as solvent for dissolving aniline monomer before the polymerization and coating process. The polyelectrolyte used in this synthesis step serves as a molecular template to pre-arrange the monomers in an ordered fashion different from the randomly distributed anilinium ions in small molecular weight and acid solutions. The aniline monomers are attached to the macromolecular electrolyte. When the polyelectrolyte/aniline complex is oxidized the aniline monomer polymerizes to form polyaniline with a morphology substantially different from that shown in FIG. 2. For example, when polyacrylic acid is used as a morphology modifier, a polyaniline/polyacrylic acid complex is formed and the polymer morphology is shown in FIG. 3. This new electrochromic material has even more void space than that of FIG. 2. Furthermore, it was found that the fibers are polymer composites that consist of entangled polyaniline and polyacrylic acid molecules. FIG. 5 shows the electron micrograph of a different composite, the globular beads are entangled polyaniline/poly(sodium 4-styrenesulfonate) complex. The electrochromic material in FIG. 5 is much less porous than that of FIG. 2 and FIG. 3. The methods for modifying polymer morphology and forming composites were presented in a recent publication (Hwang, J. H., Yang, S. C., Synth. Metal, Vol. 290, pp. E271-276 (1989)) but the concept of using these modified morphology to improve electrochromic device performance in the way described here was not disclosed.

Figure 7:
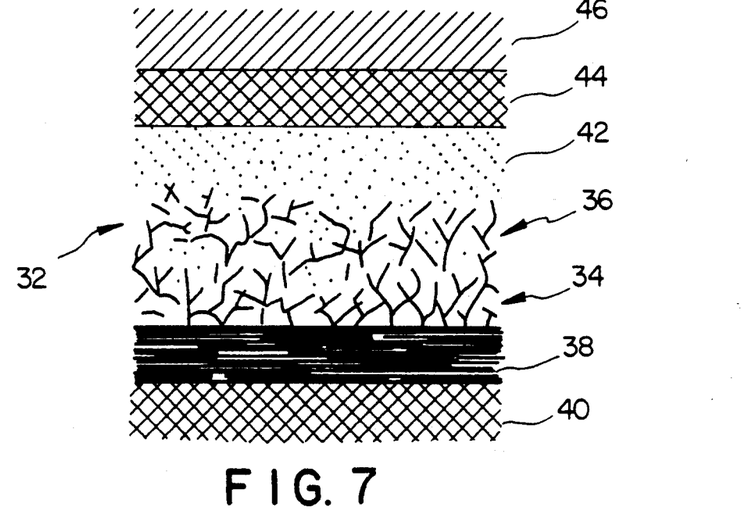
FIG. 7 is an illustration of an electrochromic device with the composition of the invention.

To see how the controls over polymer morphology may be used to construct better electrochromic devices, a schematic of an improved electrochromic device 30 in FIG. 7. This device differs from that of FIG. 1 in the electrochromic layer. An electrochromic layer 32 in FIG. 7 has two sub-layers 34 and 36. The layer 34 in contact with an electrode 38 has a relatively high density to form a dense coverage of polyaniline on the electrode. The other layer 36 has a relatively open structure to allow penetration of the solid electrolyte into the channels or void space in the electrochromic material.

The over-layer of open structure can be made by using an appropriate polyaniline/polyelectrolyte polymer composite. The use of polyaniline/polyacrylic acid will be shown as an example in the latter part of this disclosure but the principle can be applied to other polyaniline/polyelectrolyte composites that have similar characteristics.

The advantages are:

(1) The contacting surface area between the electrochromic layer and the electrolyte layer in FIG. 7 is larger than that in the prior art shown in FIG. 1. In the prior related inventions, a certain degree of improvement, as shown in the electron micrograph of simple polyaniline fiber networks in FIG. 2, was achieved. By forming a polyaniline/polyacrylic acid composite we have achieved further increase of open structure as evidenced in the electron micrograph in FIG. 3.

(2) The composite fiber of polyaniline/polyacrylic acid composite of FIG. 3 is expected to be mechanically stronger than the pure polyaniline fibers of FIG. 2. The polyaniline molecule carries positive charge when it is in the green conductive state, or when it is protonated at the nitrogen atoms of the polymer backbone therefore it is a charge-variable (varied by controlling the electrochemical potential) polycation. The polyacrylic acid in the composite fibers of FIG. 3 is partially ionized to form carboxylate anion groups. These two polymers form polycation and polyanion pairs similar to the known complex between poly(vinylbenzyltrimethylammonium chloride) chloride and sodium polystyrenesulfonate. This type of polyelectrolyte complexes have good mechanical strength so that it can be used as ultrafiltration membrane. (Lysaght, M. J., Technology of polyelectrolyte complexes, p. 282 in "Ionic Polymers", editor L. Holliday, Published by Applied Science Publishers, London, 1975).

(3) The composite fiber of FIG. 3 is expected to be more easily swelled by a polar solvent and more flexible than the un-complexed fiber in FIG. 2 to go through the expansion and the contractions of the polymer dimension during the color cycles. Comparing to the simple polyaniline fibers of FIG. 2, the composite fiber is relatively easy to open up molecular sized holes for electrolytes to transport through.

(4) The incorporation of polyacrylic acid into the electrochromic polymer fiber causes a change in the nature of the ion transport processes and this change is advantageous for getting faster and more uniform color switching. Comparing the simple polyaniline fibers, the composite is better swelled by solvents and the electrolytes so the ion transport and the polymer dimensional changes accompanying the color switching are more easily accommodated. The reason for this last point is explained in the following paragraphs.

In the inventor's previous publication cited in the above paragraph, it was pointed out that the green-colored form has mobile positive charges (polarons) on the molecular backbone of polyaniline. While the other forms are neutral polymers at the appropriate pH values. As the color of the polymer is switched from clear to green, for example, the positive charge of the polymer is increased. The electrical neutrality of the polymer fiber is maintained in different manners for these fibers. The polyaniline fibers in FIG. 2 will absorb more anions such as the chloride ions to balance the extra positive charge of the green form of polyaniline. This fiber will release the chloride ions when it is switched to the transparent state. The ions that get shuttled across the fiber/electrolyte interface are anions.

In contrast, the ions that get shuttled in the fibers of FIG. 3 are cations. The polyaniline/polyacrylic acid composite fiber contains immobilized anion (the carboxylate ion) on the polyacrylic acid backbone. This immobilized anions largely neutralize the positive charge of polyaniline when it is in the green form. The polyaniline/polyacrylic acid complex becomes negatively charged in the clear stage because positive charge is removed from polyaniline backbone. Therefore, the fibers release small cations, such as protons, lithium or potassium during the clear-to-green half cycle but absorbs cations during the green-to-clear half cycle.

Because the composite fiber has immobilized anions, the interior of the fiber is kept hydrophilic in all color stages. This means that the fiber is highly swelled by the polar solvents and is rich in the supply of the counter ions. The prior art of polyaniline without a polyelectrolyte composite gives a fiber that will have to expel a large fraction of its polar solvents and ions as it is turned into a largely hydrophobic polymer when it is switched to a neutral polymer at either the clear and the blue color states. The composite has better performance because of the dimension of the channels for ion transport or movement in the fiber are larger and do not shrink when the polymers change into the clear and the blue color stages. These differences make the composite swell better and also because of the ion exchange properties of the complex there is a reserve of ions within the polymer fiber so the counter ions needed to balance the electrical charge are more easily supplied when the color of the electrochromic material is switched.

The ion movements are reversed when the applied potentials are in the other direction. Thus, in each cycle of the color switchings not only do the electrons flow back and forth between the working electrode and the electrochromic polymer, the ions also flow back and forth between the electrochromic polymer and the electrolyte phase.

The electrons move between polyaniline and the working electrode, and ions move between polyaniline and the polymer electrolyte. An electrochromic device should have good conductive pathways for electrons to move from the polyaniline to the working electrode, and it should have a polymer morphology that allows the ions to move from the electrolyte to polyaniline molecules. In the present invention, these requirements are satisfied by modifying the morphology of polyaniline.

The morphological modifications are favorable for low molecular weight ionic transport between the electrolyte phase and the electrochromic phase. The fact that some of the polymer electrolytes can be incorporated into polyaniline gives two additional favorable situations. The polymer electrolyte, being hydrophilic, swells considerably due to the presence of the water molecules. The polymer electrolyte incorporated into polyaniline fiber also tends to swell the polyaniline fiber therefore enlarging the microscopic channels for the $Cl^-$ and the $H^+$ ions to pass through.

The polymer electrolytes incorporated into or bonded to the polyaniline fibers serve as an internal reserve of protons and anions. When polyaniline is switched to a state that demands ions the polymer electrolytes will supply the needed ions from within the composite fiber. This is faster than the diffusion process from the electrolyte film to the polyaniline film. Although the fiber still needs to acquire the ions from the electrolyte phase to achieve an overall electrical balance but that can be achieved well after the color switching is practically finished. This method of borrowing ions from the adjacent polymer electrolyte is useful for achieving a faster switching of color.

Figure 6:
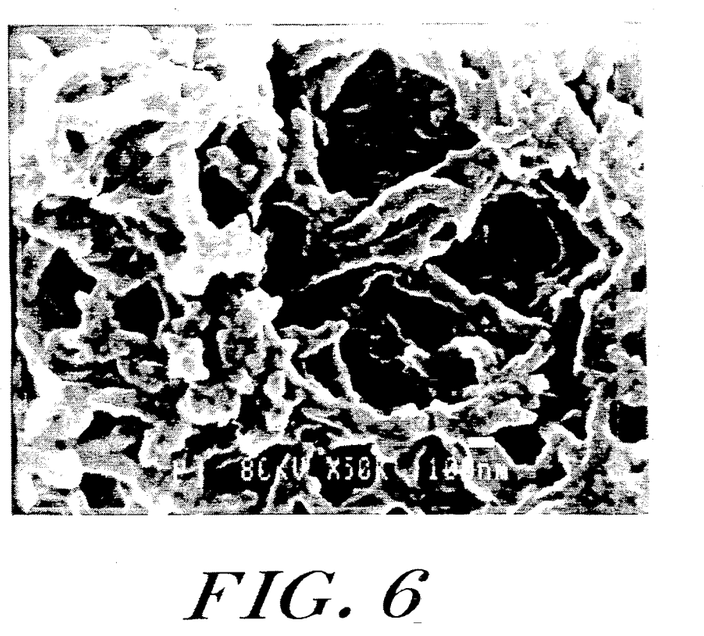

The reason for the advantage of a relatively dense coverage at the interface between the conductor electrode 38 and the electrochromic layer 34 of FIG. 6 is as follows. At this interface, electrons are to be transferred between the contacting electrode and the electrochromic material. A dense coverage of the electrochromic material on the electrode is advantageous for giving a smaller electrical resistance, therefore, faster switching speed, and a better mechanical binding between the electrode and the electrochromic material. Therefore it is desirable to have a dense coverage in the first layer of electrochromic material at the surface of the conductor electrode 38.

An open and porous structure of the electrochromic fibers is desirable for ion communication with the electrolyte. Such a requirement can be satisfied by using an electrochromic material that has a dense first layer and a porous over-layer as pictured in FIG. 7.

Figure 4:
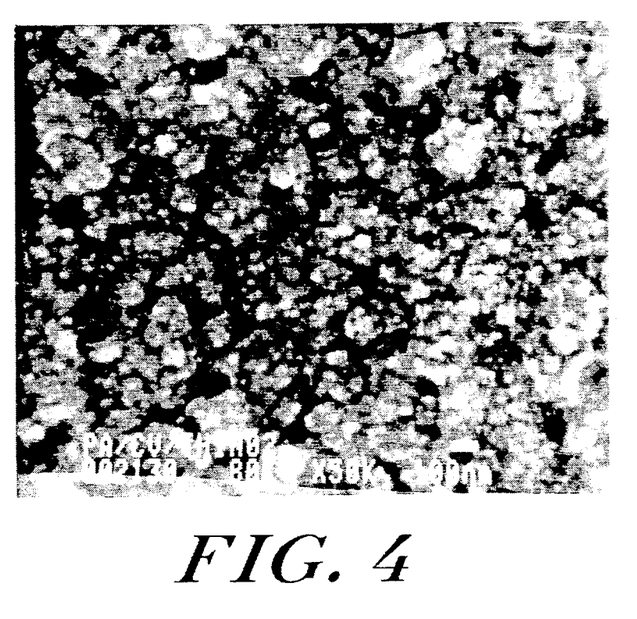

This can be accomplished in several ways. One of the methods is to deposit a simple, uncomplexed polyaniline on the first layer using a different method than that for the formation of fibers of FIG. 2. Fibers of FIG. 2 are formed by potentiostatic electrochemical plating of polyaniline on tin oxide coated glass. The first layer is fibers of polyaniline with one end anchored on the surface of tin oxide. The density of the anchoring point per unit surface area of the electrode is low so the first layer coverage is not dense. (Zhang, D, Hwang, J. H., Yang, S. C., Synth. Metals, Vol. 29, pp. E251–E256 (1989)). A much denser morphology can be formed by cycling the electrochemical potential of tin oxide electrode immersed in acidic aniline solution between $-0.2$ V and $+0.7$ V vs S.C.E. at 1 minute per cycle. A dense coverage is formed and an electron micrograph is shown in FIG. 4.

An alternative way to form a dense first layer on tin oxide glass is to synthesize polyaniline/poly(sodium 4-styrenesulfonate) composite by the following method.

Step A. Prepare aniline monomer solution:

Dissolve 9 grams of aniline in 100 ml of 1M HCl solution. Mix this solution with 100 ml of poly(sodium 4-styrenesulfonate) aqueous solution (concentration of the polyelectrolyte=20% by weight).

Step B. Electrochemical polymerization:

A tin oxide coated glass is immersed in the solution prepared in A as the working electrode. Anodic oxidation is accomplished by potentiostatic control of the potential at 0.65 V vs. a Saturated Calomel reference electrode (S.C.E.). A green colored polyaniline/poly(styrenesulfonic acid) composite is formed.

Elemental analysis of the electrochromic material formed in this way shows that the molar ratio of the aniline unit and the styrenesulfonate unit varies from 2:1 to 1:1. The morphology of this polyaniline/poly(sodium 4-styrenesulfonate) is shown in FIG. 5.

The following illustrates the application of the concepts developed in this invention in three examples.

EXAMPLE 1

In this example is illustrated the fabrication of an electrochromic device using polyacrylic acid to modify the synthesis condition.

The device fabrication proceeds as follows in five steps, A through E.

A. Dissolve aniline monomer in polyacrylic acid.

Add 5 grams of aniline monomer in 100 ml aqueous solution of polyacrylic acid (concentration of polyacrylic acid=25% by weight, average molecular weight of polyacrylic acid=90,000). Dilute this solution to 100 ml.

Add 0.75 gram of KCl to this solution to increase its ionic conductivity. Add HCl drop by drop to bring the pH of solution to between 2 to 3. We believe that in this process, the aniline monomers complex with polyacrylic acid. The monomers attached to polyacrylic acid via hydrogen bonding or ion pairing. The acrylic acid molecule serves as a template to pre-arrange the aniline monomers into a linear array.

B. Electrochemical polymerization of aniline and formation of thin film composite polymer of polyaniline and polyacrylic acid of tin oxide coated glass.

A tin oxide coated glass was immersed in the solution prepared in A and was connected to a potentiostat as a working electrode. Electrolysis was performed by maintaining the working electrode at +0.7 V vs a Saturated Calomel Electrode (S.C.E.).

In this process the monomers bounded to polyacrylic acid are arranged in an order different from a randomly dispersed monomer solution, the polymerized product has a morphology different from that of the conventionally synthesized polyaniline. FIG. 3 is the electron micrograph of polyaniline synthesized by the method described in this example. The scale bar in the picture indicates the length of 100 nanometer. It can be seen that the polyaniline morphology is modified by using polyacrylic acid as a template to bind aniline monomer. The polymer fibers in FIG. 3 has more void space than that of FIG. 2 and the shape of the fibers are different.

The open morphology of polyaniline in FIG. 3 is advantageous for increasing the contacting surface between the electrochromic layer of polyaniline and the solid electrolyte to be laid down in the next step of fabrication. It was mentioned before that there are also advantages not revealed by the electron micrographs but are revealed by analyzing the difference in composition of the fibers of FIGS. 2 and 3. The fibers of the electrochromic layer formed by this method, FIG. 3, are actually composites of entangled polyaniline and polyacrylic acid molecules. Elemental analysis of the fibers synthesized in this example indicates that the fiber contains substantial amount of the template polymer, polyacrylic acid. The reason for forming composite is the following: The aniline monomers polymerizes into the electrically conductive form of polyaniline which is a positively charged polymer cation (References: P. M. McManus, S. C. Yang and R. J. Cushman, Chem. Commun., J. Chem. Soc. p. 1556 (1985). R. J. Cushman, P. M. McManus and S. C. Yang, J. Electroanl. Chem., Vol. 291 (1986) p. 335-346, R. J. Cushman, P. M. McManus, S. C. Yang, Makromol. Chem., Rapid Commun. Vol. 8 (1987) p. 69-75.). The positively charged polyaniline cation attracts the partially ionized polyacrylic acid which carries negative charge. As the chain length of polyaniline increases and the polyaniline/polyacrylic acid complex aggregate into fibers, the molecular chains of these two components of the complex get entangled to the extent that does not allow them to separate by either washing or by electrochemical switching of the electrochromic material.

It was mentioned in the earlier sections that the first layer of the electrochromic material has a dense morphology similar to that shown in FIG. 6. This achieves a graded structure for the electrochromic layer pictured in FIG. 7.

C. Coating of solid electrolyte onto the electrochromic layer.

Aqueous solution of poly(2-acrylamido-2-methyl-1-propane-sulfonic acid), containing small amounts of KCl and HCl is spin coated on the composite polymer. The coating can also be achieved by dipping the electrode/electrochromic layer into dilute aqueous solution of the solid electrolyte and then dry the coating under controlled humidity.

D. Preparation of electrode 1 in FIG. 7.

A transparent tin oxide coated glass is also spin coated with solid electrolyte. This transparent electrode is pressed onto the multi-layer structure made in step C to form a structure of glass/tin oxide/polyaniline-polyacrylic acid/poly(2-acrylamido-2-methyl-1-propane-sulfonic acid)/tin oxide/glass.

E. Tests

The cell constructed in step D is color-switched by applying a varying voltage across the cell. As the voltage varies from −1.5 to +1.5 V, the color changes from clear to green, then to blue. The value of the peak voltage is somewhat dependent on the thickness of the polyelectrolyte coating. The device switches color in less than 0.5 seconds and the color change is uniform over a large area. This performance is better than that of morphologically unmodified polyaniline, FIG. 2, which switches slower (about 5 seconds switching time for comparable optical density) and the color change is not as uniform over the coated area (there are patches that switch slower).

EXAMPLE 2

Same as Example 1 except that the solid electrolyte used in step C is made from an aqueous solution of polyvinyl alcohol and small amounts of phosphoric acid. Similar performance is obtained.

EXAMPLE 3

Same as Example 1 except adding two steps (A2 and A3) between steps A and B to form a dense first layer by cycling the electrochemical potential.

Step A2. Prepare monomer solution 2.

Make an aqueous solution of aniline monomer and HCl. The concentration of aniline is 1M and the concentration of HCl is 3M.

Step A3. Formation of the first layer coating.

A tin oxide coated glass is used as working electrode, a platinum electrode is used as counter electrode, a Saturated Calomel Electrode (S.C.E.) was used as reference electrode. A potentiostat with voltage scanning capability was used to perform electrolysis of the solution made in step 2A. The electrochemical potential was cycled between −0.2 V and +0.7 V vs. S.C.E. at a scan rate between 1 and 2 minutes per cycle. The cyclic voltamogram was recorded for the purpose of monitoring the film thickness. When the characteristic cyclic voltametric wave showed 20 microamp peak current per square centimeter of electrode area, the polyaniline coating showed slight green color and the electrolysis was stopped. The electrode was rinsed with 0.1M HCl solution and was placed in the solution prepared in Step A of Example 1 and start the electrolysis described in Step B of Example 1.

We now turn to the discussion of the interface between the electrochromic material and the electrode. We have recently found that the switching speed of the electrochromic layer is increased if this first layer of polyaniline has a dense morphology (D. Zhang, et al supra). If the morphology is not dense enough, the rate of charge flow from the electrode to the electrochromic material will be limiting the rate of color switching.

When the template molecule in the synthesis step in Example 1 is replaced by poly(styrene sulfonic acid), a dense morphology is formed (see FIG. 4). Alternatively, a dense morphology can be formed by electrochemically cycling the working electrode between $-0.2$ V and $+0.7$ V vs. S.C.E. in an aniline solution dissolved in $-3$M HCl (see FIG. 5).

It can be seen in FIG. 5 that the morphology is much denser than that in FIG. 3. The microscopic shape of these two materials is also distinct. The polyaniline/polyacrylic acid composite form networks of long and relatively straight fibers, but the polyaniline/poly(sodium 4-styrenesulfonate) composite form densely packed globular beads. The difference comes from the molecular interactions between the template electrolyte and the aniline monomers before polymerization of aniline. When aniline monomer binds to polyacrylic acid, it partially ionizes the polyacrylic acid to give carboxylate groups. When a few carboxylate anion groups are formed on a single polyacrylic acid chain, the coulomb repulsion between the negatively charged groups cause the polyacrylic acid backbone to stretch into a straight chain instead of a random coil, at the same time, the unionized carboxylic acid groups form hydrogen bonds with aniline monomers to bind aniline monomers. Upon polymerization, the relatively stiff chains polyaniline/polyacrylic acid aggregate into long and relatively straight fibers.

The complex of monomer aniline and poly(sodium 4-styrenesulfonate) is a random coil in aqueous solution for reasons explained in the following. Before the electrochemical polymerization, the anilinium ions binds to the aromatic rings of the styrene sulfonate unit via hydrophobic interaction and also by the ion pairing of the positive charge of the anilinium ion and the sulfonate. Since the ion pairs effectively neutralizes the negative charge carried by the sulfonate group, the coulomb repulsion between segments of a single chain of the complex has been effectively screened. The anilinium ion/poly(sodium 4-sulfonate) complex is closer to be a random coil in the solution. This configuration allows polymerization into a denser globular bead morphology.

An electrochromic material with graded density can be synthesized by making a dense first layer using the two techniques described in the preceding paragraphs, and then coat over the first layer a porous structure by the method similar to that for making the material in FIG. 3. It is conceivable that multiple layers with graded properties continuously varying across the thickness of the film can be made by employing several steps of polymerization and coating.

In certain cases the need for two-step or multiple step coating of the electrochromic layer can be avoided and still achieve a graded structure pictured in FIG. 6. The reason for obtaining a graded structure is originated from the fact that the kinetics for polymerization of aniline is influenced by the substrate electrode surface when the first layer of polyaniline is formed, but the influence of electrode gradually diminishes as the film becomes thicker. Because polyaniline is an electrical conductor, the polymer itself can serve as an electrode and the monomers can be polymerized at either the bare tin oxide (or other electrode material) surface or at the polymer fiber. At the beginning of the electrochemical polymerization, the competition between the deposition of aniline on the bare electrode or on polyaniline is important because at that moment most of the available surface is that of the electrode material. At later stage, the surface area is dominantly that of polyaniline so the polymerization mostly occur on the existing polyaniline surface to extend the length of the fiber. There are two ways to influence the initial growth of polymer to get a denser morphology at the first layer: (A) Slow down the polymerization rate for monomers to attach on the existing polyaniline surface so that the polymerization on the bare surface becomes more competitive. (B) Speed up the rate of polymerization on bare electrode surface by changing the electrode surface into a better electro-catalyst. Sometimes this means using a different electrode material or a coating.

As an example of Method A is seen in FIG. 6 which show a dense thin layer of polyaniline/polyacrylic acid. We believe that the dense carpet like morphology is formed because the rate of polymerization of the aniline monomer/polyacrylic acid complex on the polyaniline/polyacrylic acid conducting polymer surface is slower than the rate of polymerization on bare tin oxide surface.

As the polyaniline/polyacrylic acid layer becomes thick enough the ratio of the polymer surface area to that of the bare electrode surface area increases so most of the polymerization reaction takes place on the surface of the polyaniline electrode (the open end of the polyaniline/polyacrylic acid fiber) so the fibers start to elongate into that of the morphology shown in FIG. 3. Therefore by using polyacrylic acid to dissolve aniline monomer, the dense morphology of the first layer pictured in FIG. 6 is formed initially at an accumulated electrolysis charge of about 10 to 20 milicoulomb per centimeter. When the electrolysis charge is accumulated to 100 milicoulomb or more, the morphology is that of FIG. 3. In this way the graded structure of FIG. 7 is accomplished in a single kind of monomer solution.

Method B was shown by replacing the tin oxide electrode by a gold or platinum surface. In this case the surface is a good electro-catalyst for polymerization of aniline so that initially when there is still bare electrode surface not covered by polymer the rate of forming nucleation site and the rate of polymer formation on the bare electrode surface is high and the surface is first densely covered until all the surface is used. The subsequent electrochemical polymerization occurs exclusively on the polyaniline surface and the morphology resembles that of FIG. 2. The polymerization can be performed in an acidic solution of aniline and HCl (concentrations, aniline 1M, HCl 3M), using potentiostatic electrolysis for polymerization. The electron micrographs can be found in our recent publication (Zhang, D., Hwang, J. H., Yang, S. C., Synthetic Metals, Vol. 29, pp. E252–E256 (1989)). In this case we again use a single solution and single potentiostatic electrolysis for accomplishing a graded structure pictured in FIG. 7.

The last two methods mentioned is less general than the method for using separate steps of coating mentioned earlier.

Referring again to FIG. 7, the electrochromic device 30 embodying the invention is shown. An electrochromic film 32 is divided into two layers 34 and 36. The layer 34 of polyaniline in direct contact with the working electrode 38 is a collection of densely packed polyaniline fibers, each fiber having good electrical contact with the conductor of the working electrode so that electrons are moved across the polyaniline/working electrode interface easily. Grown on top of this thin first layer 34 is a layer 36 of polyaniline polymers with their morphology modified by the synthesis in polymer electrolyte solutions. These polymers are in good electronic communication with the first layer of polyaniline and have a relatively open structure to allow easy ionic movements across the polyaniline/electrolyte boundary. This region is a graded interface of decreasing density. The film 34 is cast on the electrode 38 which in turn is supported on a surface 40. A polyelectrolyte film 42 contacts both the film 36 and an electrode 44. The electrode is supported on a surface 46.

The relative thicknesses of the polyaniline, polyaniline/electrolyte and electrolyte films of FIG. 7 may vary; illustrative ranges include 0.1 to 1.0 microns for the polyaniline; 0.01 to 0.10 microns for the polyaniline/electrolyte; and 10 microns to one mm for the electrolyte. In this invention both sides of the boundary between the polyaniline/electrolyte and the electrolyte are made of flexible polymers. The flexibility of polymer backbone greatly accomodates the necessary swelling and the shrinking during the cycling.

If the polymer electrolyte is cast onto this electrochromic polyaniline, the polymer fibers at the interface tends to be tangled so the interface is not a sharp boundary but a region where two types of polymer form high-surface area contact. The use of polyaniline with the polymer electrolyte provides both the mechanical strength and the cycling reversibility at the interface. The invention has been described in reference to the use of certain monomeric analines in combination with certain specified polyelectrolytes. Any of the monomeric analines may be used alone or in combination for the electrochromic material to form the electrochromic layer. Further, any of the monomeric analines may be used alone or in combination with any one of the polymer electrolytes disclosed and/or with any combination of polymer electrolytes disclosed.

Lastly, the electrolytic film or layer as described preferably as being the same as the polyelectrolyte used in the electrochromic material-polyelectrolyte film. First, other polymer electrolytes may be used other than the one used in the electrochromic material-polyelectrolyte film and non-polyelectrolytes may be used in combination with the electrochromic material-polyelectrolyte film as long as said electrolyte functions to store and transfer ions.

Having described our invention, what we now claim is:

1. An electrochromic composition which comprises: an electroconductive polyaniline/polyelectrolyte matrix, the matrix characterized by interstices, the polyaniline having incorporated therein the polymeric electrolyte, said electrolyte in ion transfer relationship with said polyaniline.

2. The composition of claim 1 wherein the electrolyte is a solid polymeric electrolyte.

3. The composition of claim 2 wherein the electrolyte is selected from the group consisting of poly-(vinyl sulfonic acid) and its salts, poly-(acrylic acid), poly-(styrene sulfonic acid), poly-(2-acrylamido-2-methyl-1-propane-sulfonic acid), poly-ethylene oxide, and polyphosphazenes.

4. The composition of claim 2 wherein the solid electrolyte is a polyelectrolyte.

5. The composition of claim 4 wherein the polyelectrolyte is selected from the group consisting of polyacrylic acid and polystyrene sulfonic acid.

6. The composition of claim 5 which includes an effective amount of a high dielectric constant solvent to enhance the movement of ions within the matrix.

7. The composition of claim 2 wherein the solid electrolytes are gel electrolytes.

8. The composition of claim 7 wherein the gel electrolyte are selected from the group consisting of crosslinked polyacrylic acid and polysulfonic acid.

9. The composition of claim 8 which includes an effective amount of a polar solvent and a salt to enhance the movement of ions within the matrix.

10. The composition of claim 1 wherein the monomeric analine is selected from the group consisting of wherein $R_1$ to $R_8$=any one of the following: —H, —$(CH_2)_nCH_3$(n=o to 10, —$OCH_3$, —$OC_2H_5$, —$NH_2$ —Cl, —F, —Br, —I, —CN, —$SO_3H$, —$NO_2$, —$(CH_2)_m$—(CH)n—$(CH_2)_l$—$CH_3$ (where m, n, l=0 to 5 and X=any of the above groups).

11. The composition of claim 1 wherein the molar ratio of the electrochromic material to the electrolyte in the matrix varies from 2:1 to 1:1.

12. The composition of claim 1 wherein the polymeric electrolyte comprises a film free of monomeric analine which film interfaces with the matrix.

13. The composition of claim 12 wherein the film comprises an inner surface which interfaces with the matrix and an outer surface and the density of the electrolyte increases from the inner surface to the outer surface.

14. The composition of claim 1 which comprises a film of polyaniline free of electrolyte which film interfaces with the matrix.

15. The composition of claim 14 wherein the film comprises an inner surface which interfaces with the matrix and an outer surface and the density of the polyaniline from the inner surface to the outer surface.

16. The composition of claim 1 wherein the matrix is characterized by immobile anions and is hydrophilic in all color stages and is characterized by excess counter ions.

17. An electrochromic device having first and second conductive electrodes in spaced apart relationship;
an electrolyte in contact and ion transfer relationship with the first electrode;
an electrochromic material in contact and electron transfer relationship with the second electrode, a matrix of polyaniline/polyelectrolyte interposed between and in contact and ion transfer relationship with the electrochromic material and the electrolyte respectively, the polyaniline in the matrix having polyelectrolyte incorporated therein.

18. The electrochromic device of claim 17 wherein the density of the electrochromic material in the polyaniline/polyelectrolyte matrix decreases from the second electrode to the polyelectrolyte.

19. The device of claim 17 wherein the electrodes are tin oxide electrodes.

20. The composition of claim 17 wherein the electrochromic material in contact and electron transfer with the second electrode is polyaniline and the thickness of the polyaniline is between 0.1 and 1.0 microns; 0.01 to 0.10 microns for the polyaniline/electrolyte and 10 microns to 1 millimeter for the electrolyte.

21. The electrochromic device of claim 17 which comprises:
means to support the electrodes; and
wherein the electrochromic layer has two sublayers, a first relatively high density layer in contact with the electrode, and a second less dense layer to allow penetration of the solvent electrolyte into the channels or void space in the electrochromic material.

22. The composition of claim 21 wherein the electrolyte is a solid polymeric electrolyte.

23. The composition of claim 21 wherein the electrolyte is selected from the group consisting of poly-(vinyl sulfonic acid) and its salts, poly-(acrylic acid), poly-(styrene sulfonic acid), poly-(2-acrylamido-2-methyl-1-propane-sulfonic acid), poly-ethylene oxide, and polyphosphazenes.

24. The composition of claim 23 wherein the solid electrolyte is a polyelectrolyte.

25. The composition of claim 24 which includes an effective amount of a high dielectric constant solvent to enhance the movement of ions within the matrix.

26. The composition of claim 23 wherein the polyelectrolyte is selected from the group consisting of polyacrylic acid and polystyrene sulfonic acid.

27. The composition of claim 22 wherein the solid electrolytes are gel electrolytes.

28. The composition of claim 27 wherein the gel electrolytes are selected from the group consisting of cross-linked polyacrylic acid or polysulfonic acid.

29. The composition of claim 28 which includes an effective amount of a polar solvent and a salt to enhance the movement of ions within the matrix.

30. The composition of claim 17 wherein the monomeric analine is selected from the group consisting of wherein $R_1$ to $R_8$=any one of the following: —H, —(CH$_2$)$_n$CH$_3$(n=o to 10, —OCH$_3$, —OC$_2$H$_5$, —NH$_2$ —Cl, —F, —Br, —I, —CN, —SO$_3$H, —NO$_2$, —(CH$_2$)$_m$—(CH)n—(CH$_2$)$_1$—CH$_3$ (where m, n, l=0 to 5 and X=any of the above groups).

31. The composition of claim 17 wherein the molar ratio of the electrochromic material to the electrolyte in the matrix varies from 2:1 to 1:1.

32. The composition of claim 17 wherein the polymeric electrolyte comprises a film free of monomeric analine which film interfaces with the matrix.

33. The composition of claim 32 wherein the film comprises an inner surface which interfaces with the matrix and an outer surface and the density of the electrolyte increases from the inner surface to the outer surface.

34. The composition of claim 17 which comprises a film of polyaniline free of electrolyte which film interface with the matrix.

35. The composition of claim 34 wherein the film comprises an inner surface which interfaces with the matrix and an outer surface and the density of the polyaniline from the inner surface to the outer surface.

36. The composition of claim 17 wherein the matrix is characterized by immobile anions and is hydrophilic in all color stages and excess counter ions.

37. The method for the preparation of a polyaniline/polyelectrolyte matrix which includes:
adding monomeric aniline to an acidic solution of a polyelectrolyte;
polymerizing the monomeric aniline to form polyaniline, the polyelectrolyte functioning as a template to control the morphology of the polyaniline whereby a polyaniline fibrous matrix is formed having interstices therein, molecules of the polyelectrolyte being embedded in said polyaniline matrix.

38. The process of claim 37 which includes:
polymerizing the polyaniline in the solution of polyelectrolyte;
modifying the polymer morphology of polyaniline to form a polyaniline/polyelectrolyte composition in the electrochromic layer;
incorporating the polyaniline into the polymer electrolytes; and
forming a denser morphology at the interface between the conductor electrode and the electrochromic layer.

39. The process of claim 38 wherein the polyelectrolyte is a macromolecular electrolyte and the modification of the polyaniline includes:
dissolving the aniline monomer in the solution before the polymerization;
attaching the aniline monomers to the macromolecular electrolyte to form the polyelectrolyte/aniline matrix; and
oxidizing the polyelectrolyte/aniline matrix to complete the morphological modification.

40. The process of claim 37 which includes:
polymerizing electrochemically the monomeric aniline.

41. The process of claim 37 wherein the polyelectrolyte is polyacrylic acid.

42. The process of claim 37 wherein the polyelectrolyte is a poly (sodium 4-styrene sulfonate) complex.

43. The method of claim 37 which includes:
controlling the pH of the solution to complex the monomers with the polyelectrolyte prior to polymerizing the same.

44. The method of claim 37 which includes:
coating the matrix with a solid electrolyte.

45. The method of claim 44 which includes:
forming a first dense polyaniline layer on a second electrode.

46. The method of claim 45 which includes:
coating the polyaniline on the second electrode electrochemically.

47. The method of claim 37 which includes:
coating a first electrode with the solid electrolyte.

* * * * *